United States Patent
Rose

[11] 3,790,231
[45] Feb. 5, 1974

[54] SNOWMOBILE TRACK
[75] Inventor: Edgar Rose, Glencoe, Ill.
[73] Assignee: Outboard Marine Corporation, Waukega, Ill.
[22] Filed: July 7, 1971
[21] Appl. No.: 160,408

[52] U.S. Cl. .............................................. 305/35 EB
[51] Int. Cl. ............................................ B62d 55/24
[58] Field of Search ................... 305/35 EB, 38, 37

[56] References Cited
UNITED STATES PATENTS

| | | | |
|---|---|---|---|
| 3,623,780 | 11/1971 | Kell | 305/38 |
| 2,461,150 | 2/1949 | Flynn | 305/35 EB |
| 3,205,023 | 9/1965 | Nodwell | 305/38 |
| 3,451,728 | 6/1969 | Bruneau | 305/35 EB X |
| 2,661,249 | 12/1953 | Bonmartini | 305/35 EB |
| 3,680,926 | 8/1972 | Trapp | 305/35 EB |
| 3,598,454 | 8/1971 | Richards | 305/35 EB |
| 3,582,155 | 6/1971 | Marier | 305/38 |
| 3,582,154 | 6/1971 | Russ | 305/38 |
| 3,721,477 | 3/1973 | Cooper | 305/38 |

Primary Examiner—Richard J. Johnson
Attorney, Agent, or Firm—Michael, Best & Friedrich

[57] ABSTRACT

Disclosed herein is a vehicle track comprising an elongated flexible belt having parts extending from the belt side edges and projecting outwardly from the main weight supporting belt outer surface, together with a plurality of rigid traction bars which extend transversely of the belt between the outwardly projecting belt parts and which include a web portion secured to the belt outer surface and a pair of spaced flanges extending from the transversely extending edges of the web portion and outwardly from the belt outer surface. In one embodiment, the outwardly projecting parts comprise, along each belt edge, a row of uniformly longitudinally spaced lugs and the traction bars extend with their ends received between and in abutting relation to adjacently located pairs of lugs in each row of lugs.

1 Claim, 4 Drawing Figures

PATENTED FEB 5 1974
3,790,231
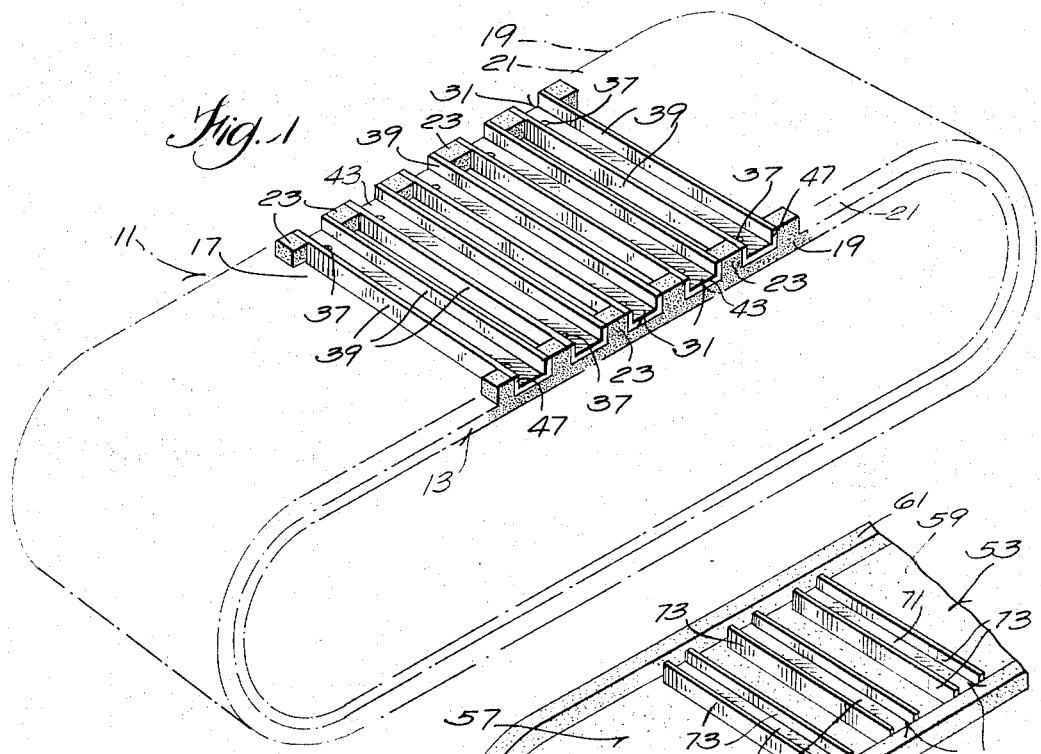
Fig. 1
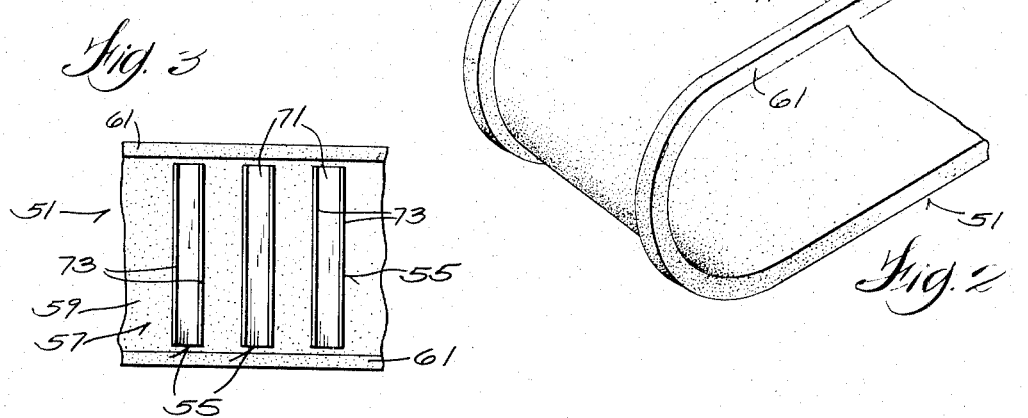
Fig. 3
Fig. 2
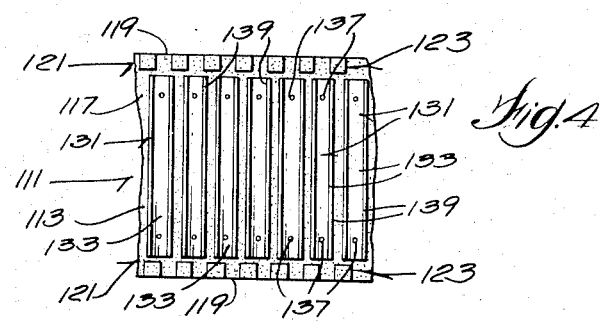
Fig. 4
Inventor
Edgar Rose
By Robert E. Clemency
Attorney

SNOWMOBILE TRACK

RELATED APPLICATION

Reference is hereby made to my earlier co-pending application Ser. No. 101,783 entitled "Snowmobile Track with Rubber Lugs Fitted Between Metal Cleats", filed Dec. 28, 1970, and now abandoned.

BACKGROUND OF THE INVENTION

Track vehicles such as snowmobiles and all-terrain vehicles sometimes exhibit a tendency toward side slippage, or sliding movement occurring transversely to the direction of travel. Such side slippage can occur, for instance, when traveling along the side of a hill at a substantial angle to the direction of slope incline. Side slipping can also occur when such vehicles are stopped on a hill with the track located with its lengthwise direction at a substantial angle to the direction of slope incline.

Reference is hereby made to the Jespersen application Ser. No. 857,494, filed Sept. 12, 1969, and particularly to the track which is shown in FIGS. 12 and 18.

Reference is hereby also made to the Trapp application Ser. No. 33,162 which was filed on May 8, 1970, as a continuation of an earlier Trapp application Ser. No. 750,105 filed Aug. 5, 1968.

Reference is hereby also made to the U.S. Flynn Pat. No. 2,461,150, issued Feb. 8, 1949, to the U.S. Bombardier Pat. No. 2,899,242, issued Aug. 11, 1959, to the U.S. Kiefer Pat. No. 3,112,727, issued Dec. 3, 1963, to the U.S. Nodwell Pat. No. 3,136,171, issued June 9, 1964, to the U.S. Hansen Pat. No. 3,362,492, issued Jan. 9, 1968, to the U.S. Roy Pat. No. 3,451,729, issued June 24, 1969, and to the U.S. Hallaman Pat. No. 3,464,743, issued Sept. 2, 1969.

SUMMARY OF THE INVENTION

The invention includes a track providing superior traction and anti-side slip capabilities. In accordance with the invention, the track comprises a belt having transversely spaced and longitudinally extending opposed side edges and parts which extend from the edges and which project outwardly from the belt outer surface. In accordance with one embodiment of the invention, the parts are interrupted to form, along each edge of the belt, a series of lugs, and there is additionally provided a plurality of transversely extending rigid traction bars which are removably connected to the weight supporting portion of the belt.

More specifically, the traction bars are generally of U-shape with the web thereof being suitably secured to the outer surface of the belt and with their ends received in the areas between the lugs and engaging the adjacent faces of the lugs so as to reinforce the lugs against breakage from the belt and so as to define spaces between the traction bars which are closed at their side ends, whereby to provide anti-slipping capability. As a consequence, the flanges provide ribs which define therebetween spaces which are alternatively opened and closed along each of the margins of the track, each closure serving to enhance anti-side slip capability. The traction bars also generally provide transverse rigidity while otherwise not materially affecting the longitudinal flexibility of the belt.

In accordance with another embodiment of the invention, the traction bars are terminated inwardly of the belt with reference to the rows or series of side lugs.

In accordance with still another embodiment of the invention, the parts constitute continuously extending ribs and there is additionally provided a plurality of transversely extending rigid traction bars having ends which terminate in spaced relation to the ribs inwardly of the belt so as to afford flexure of the ribs without engaging the traction bar ends.

More specifically, the traction bars are generally of U-shape with the web thereof being suitably secured to the outer surface of the belt and with the flanges thereof extending outwardly of the belt.

One of the principal objects of the invention is the provision of a track having superior traction and anti-side slipping capability.

Another of the principal objects of the invention is the provision of a track or belt having, along the sides thereof, parts which prevent side slipping while also including separate removable traction bars extending transversely in the area between such parts.

Another of the principal objects of the invention is the provision of a track or belt having a series of spaced lugs along one side thereof and a series of traction bars which extend into the area between lugs so as to transversely close the area between the traction bars and thereby to enhance antiside slipping capability.

Another of the principal objects of the invention is the provision of a track including metallic U-shaped traction bars which include spaced outwardly extending flanges and which cooperate with a rubber-like belt to provide both improved traction and improved anti-side slipping capability.

Another of the principal objects of the invention is the provision of an improved track which includes continuous ribs which extend along the sides of the track outwardly of a plurality of rigid traction bars removably secured to the belt and which project outwardly from the main weight supporting surface of the track.

Another of the principal objects of the invention is the provision of an improved track which is economical to manufacture and which will provide reliable service over a long and useful life.

Other objects and advantages of the invention will become known by reference to the following description and accompanying drawings.

DRAWINGS

FIG. 1 is a schematic perspective view of a track embodying various of the features of the invention.

FIG. 2 is a schematic perspective view of a second track embodying various of the features of the invention.

FIG. 3 is a fragmentary plan view of the track shown in FIG. 2.

FIG. 4 is a fragmentary plan view of still another track embodying various of the features of the invention.

GENERAL DESCRIPTION

Shown in FIG. 1 is a track 11 adapted to be used on vehicles such as, for instance, snowmobiles and all-terrain vehicles. The track 11 comprises an endless flexible belt 13 which can be fabricated of rubber or rubber-like material and which includes a main portion with a weight supporting outer surface 17 and transversely spaced and longitudinally extending opposite side edges 19 having respectively adjacently located margins 21.

Extending from each of the side edge margins 21 is a circumferentially extending series or row of longitudinally spaced lugs 23 which can be integrally molded as a part of the belt, or which can be individually vulcanized to the margins of the belt outer surface 17, or otherwise suitably connected to the belt outer surface margins 21. In each row, the lugs 23 are uniformly spaced around the periphery of the belt 13 and, in addition, the lugs 23 in the rows are also transversely aligned with one another. While other specific shapes could be employed, in the disclosed construction, the lugs 23 are approximately one-half inch cubes.

Removably secured to the belt outer surface 17 are a plurality of traction bars 31 which extend transversely of the flexible belt 13 and which are fabricated of rigid material, such as metal. In the preferred and specifically disclosed construction, each of the traction bars 31 is U-shape in cross section taken longitudinally of the belt and includes a base portion or web 33 which is secured to the belt outer surface 17 by any suitable means such as, for instance, by rivets 37. The traction bars 31 also include spaced flanges 39 which extend from the transversely extending margins of the web 33 and which project outwardly from the belt outer surface 17 beyond the outer surface of the web 33. While it is preferred to employ the disclosed U-shape traction bars, at least some of the advantages of the invention can be obtained when using traction bars which are a geometric solid with either a rectangular, square, or other cross section in the direction of the length of the belt.

The traction bars extend substantially across the width of the belt main portion and can terminate in slightly inwardly spaced relation from both series of lugs 23. In the specific construction illustrated in FIG. 1, the traction bars 31 extend to adjacent to each of the longitudinal side edges 19 and include portions 43 located within the area between adjacent lugs 23 along each of the belt margins 21. More specifically, the flanges 39 each include ends 47 which are located in abutting engagement with the adjacent surfaces of the adjacent lugs 23.

As a result of the illustrated above described construction, a series of flanges or ribs 39 are provided in parallel upstanding relation to the belt outer surface 17 whereby to provide superior traction, while at the same time, the spaces between the ribs or flanges 39 are alternately opened and closed along each of the margins so as to provide anti-side slipping capability. In this regard, the spaces between the ribs or flanges can be alternatively closed at opposite ends or alternatively every other space can be closed at both ends as shown in the drawings.

The before mentioned attachment of the traction bars 31 to the belt outer surface 17, together with the nesting of the ends 47 of the traction bars 31 into the areas or spaces between the lugs 23, serve both to reinforce the attachment of the traction bars 31 to the belt 13 and to reinforce the connection or joint of the lugs 23 to the belt 13.

Shown in FIGS. 2 and 3 is another track 51 which is adapted to be used on a snowmobile, or all-terrain vehicle, or the like and which includes a flexible endless belt 53 and a plurality of rigid traction bars 55 secured to the belt 53. More specifically, the belt 53 is fabricated of flexible rubber or rubber-like material and includes a weight supporting main portion 57 having a generally flat and uninterrupted outer surface 59. The belt 53 also includes a pair of transversely spaced outer ribs or parts 61 which continuously extend from and along the edges of the belt main portion 57 and which extend outwardly beyond the belt main portion outer surface 59. The ribs 61 can either be integrally molded with the belt main portion 57 or can be separately fabricated and vulcanized or otherwise suitably connected to the belt main portion 57. It is preferred that the ribs 61 be dimensioned so as to have a transverse cross section of about one-half square inch.

The traction bars 55 are fabricated of metal or other rigid material and are secured to the belt 53 in such manner as to permit removal and replacement, as for instance, by rivets (not shown). Any other suitable connection means can be employed. Each traction bar 55 in the construction illustrated in FIGS. 2 and 3 is U-shaped in cross section taken lengthwise of the belt 53 and includes a web portion 71 secured to the belt main portion outer surface 59 and a pair of flanges 73 which extend from the web portion 71 and which are spaced lengthwise of the belt 53 and which project outwardly from the outer surface 59 of the belt main portion 57. Although the traction bars 55 extend substantially the entire width of the belt main portion 57, it is preferred that the traction bars 55 terminate with their ends in spaced relation to the ribs 61 at a distance of at least about ⅛ inch. Such spacing permits flexure of the ribs 61 during arcuate belt movement without rubbing of the ribs 61 against the ends of the traction bars 55.

In operation of the belt 53 shown in FIGS. 2 and 3, the ribs 61 serve to prevent side slipping along a hill and aid in maintaining straight line running under various snow and ice surface conditions.

Shown in FIG. 4 is still another track 111 which embodies various of the features of the invention and which includes various of the features of the embodiment shown in FIGS. 1 through 3. More specifically, the track 111 comprises an endless flexible belt 113 which can be fabricated of rubber or rubber-like material and which includes a main portion with a weight supporting outer surface 117 and transversely spaced and longitudinally extending opposite side edges 119 having respectively adjacently located margins 121.

Extending from each of the side edge margins 121 is a circumferentially extending series or row of longitudinally spaced lugs 123 which can be integrally molded as a part of the belt, or which can be individually vulcanized to the margins of the belt outer surface 117, or otherwise suitably connected to the belt outer surface margins 121. In each row, the lugs 123 can be non-uniformly spaced with respect to one another. In addition as shown in FIG. 4, the lugs 123 in one row are located out of transverse registry with the lugs 123 in the other row. Alternatively, the lugs 123 in each row can be uniformly spaced around the periphery of the belt 113 and, the lugs 123 in the rows can be transversely aligned with one another. In addition, although the lugs 123 could individually be of different sizes, and while other specific shapes could be employed, in the disclosed construction, the lugs 123 are approximately one-half inch cubes.

Removably secured to the belt outer surface 117 are a plurality of traction bars 131 which extend transversely of the flexible belt 113 and which are fabricated of rigid material, such as metal. In the preferred and specifically disclosed construction, each of the traction bars 131 is U-shape in cross section taken longitudinally of the belt and includes a base portion or web 133 which is secured to the belt outer surface 117 by any suitable means such as, for instance, by rivets 137. The traction bars 131 also include spaced vertical surfaces or flanges 139 which extend from the transversely extending margins of the web 133 and which project outwardly from the belt outer surface 117 beyond the outer surface of the web 133. While it is preferred to employ the disclosed U-shape traction bars, at least some of the advantages of the invention can be obtained when using traction bars which are a geometric solid with either a rectangular, square, or other cross section in the direction of the length of the belt.

The traction bars 131 extend substantially across the width of the belt main portion and terminate in slightly inwardly spaced relation from both series of lugs 123 so as to afford flexure of the lugs 123 independently of the traction bars 131. In the specific construction illustrated in FIG. 4, the traction bars 131 are uniformly spaced with respect to each other and are located in random relation to the lugs 123. Alternatively, the traction bars 131 can also be arranged at random or uneven spacing from one another.

As a result of the above described construction, a series of transverse vertical surfaces are provided in parallel upstanding relation to the belt outer surface 117 whereby to provide superior traction, while at the same time, lengthwise vertical surfaces are provided to afford anti-side slipping capability.

Various of the features of the invention are set forth in the following claims.

What is claimed is:

1. A track for a track vehicle, said track comprising an elongated flexible belt of rubber or rubber-like material and including a non-aperatured main portion having an outer surface and a series of spaced ribs extending from each of the transversely spaced side edges of said belt main portion and projecting outwardly and beyond said belt main portion outer surface, and a plurality of rigid, metal traction bars secured to said belt main portion outer surface in spaced relation longitudinally of said belt and extending transversely of said belt, said traction bars being U-shaped in cross section longitudinally of said track and including a web portion secured to said belt main portion outer surface and a pair of spaced flanges extending from said web portion and outwardly from said belt main portion outer surface, said traction bars terminating with transversely spaced ends located in transversely inwardly spaced relation from said series of ribs.

* * * * *

UNITED STATES PATENT OFFICE
CERTIFICATE OF CORRECTION

Patent No. 3,790,231  Dated February 5, 1974

Inventor(s) Edgar Rose

It is certified that error appears in the above-identified patent and that said Letters Patent are hereby corrected as shown below:

ADD the following Claim:

--- 2. A belt in accordance with Claim 1 wherein said ribs in said series are uniformly spaced within each series and wherein said ribs in one of said series are transversely aligned with said ribs in the other of said series.

Signed and sealed this 17th day of September 1974.

(SEAL)
Attest:

McCOY M. GIBSON JR.
Attesting Officer

C. MARSHALL DANN
Commissioner of Patents